United States Patent
Sutter

(10) Patent No.: US 8,359,956 B1
(45) Date of Patent: Jan. 29, 2013

(54) LATHE ROSE DEVICE

(76) Inventor: Michael Sutter, Murfreesboro, TN (US)

( * ) Notice: Subject to any disclaimer, the term of this patent is extended or adjusted under 35 U.S.C. 154(b) by 602 days.

(21) Appl. No.: 12/701,363

(22) Filed: Feb. 5, 2010

Related U.S. Application Data

(60) Provisional application No. 61/150,637, filed on Feb. 6, 2009.

(51) Int. Cl.
*B23B 5/00* (2006.01)
*B23B 5/02* (2006.01)

(52) U.S. Cl. .................................. 82/15; 82/55

(58) Field of Classification Search ............... 82/15, 55, 82/101, 146, 148, 162, 152, 151, 149
See application file for complete search history.

(56) References Cited

U.S. PATENT DOCUMENTS

| | | | | |
|---|---|---|---|---|
| 1,428,801 A | * | 9/1922 | Oulton | 82/19 |
| 2,121,934 A | * | 6/1938 | Snader et al. | 82/19 |
| 2,859,658 A | * | 11/1958 | Brandstatter | 33/18.1 |
| 3,087,365 A | * | 4/1963 | Rose et al. | 82/110 |
| 3,387,516 A | | 6/1968 | Martin | |
| 3,434,384 A | | 3/1969 | Cowles | |
| 3,626,456 A | | 12/1971 | Freeborn | |
| 3,630,111 A | * | 12/1971 | Hartford et al. | 82/15 |
| 4,457,192 A | | 7/1984 | Eibenschutz | |
| 4,535,660 A | | 8/1985 | Osterman | |
| 4,588,005 A | | 5/1986 | Sliker | |
| 4,624,159 A | | 11/1986 | Kumer | |
| 5,816,123 A | | 10/1998 | Schauer | |
| 7,316,173 B2 | * | 1/2008 | English | 82/148 |

* cited by examiner

*Primary Examiner* — Will Fridie, Jr.
(74) *Attorney, Agent, or Firm* — QuickPatents; Kevin Prince

(57) ABSTRACT

A rose engine apparatus is disclosed for attaching to a lathe having a lathe bed and a headstock with a rotatable spindle. The apparatus includes a pivotal attaching means for pivotally attaching the headstock with the lathe bed. At least one cam is selectively fixable to a cam attachment means fixed to the spindle of the headstock, each cam having a continuous, variable radius along a peripheral edge thereof. A cam roller is fixed with the lathe bed so as to make contact with the peripheral edge of a selected cam. A biasing spring urges the selected cam against the roller means, such that the headstock pivots with respect to the lathe bed as a function of the variable radius of the selected cam, as the spindle and workpiece rotates. As such, cutting operations can be performed on the workpiece that correspond to the variable radius of the selected cam. The apparatus may be bypassed to allow conventional operation of the lathe without removing the apparatus therefrom.

16 Claims, 7 Drawing Sheets

# US 8,359,956 B1

LATHE ROSE DEVICE

CROSS-REFERENCE TO RELATED APPLICATIONS

This application claims the benefit of U.S. Provisional Patent Application 61/150,637, filed on Feb. 6, 2009, and incorporated herein by reference.

STATEMENT REGARDING FEDERALLY SPONSORED RESEARCH AND DEVELOPMENT

Not Applicable.

FIELD OF THE INVENTION

This invention relates to lathe accessories, and more particularly to a rose engine accessory for a lathe.

DISCUSSION OF RELATED ART

The so-called "rose engine" is a tool that allow for ornamental turning of a workpiece. Heretofore, such devices necessarily were stand-alone tools having their own support frame. For example, the "Holtzaffel" of the 1850's is such a dedicated tool. Floor space in a workshop, for example, can be insufficient to accommodate both a rose engine and a conventional lathe, so frequently a workshop owner must go without one or another of these tools.

Auxiliary tools for attaching to conventional lathes are known in the prior art. For example, U.S. Pat. No. 4,588,005 to Sliker on May 13, 1986, teaches a duplicator attachment, which facilitates duplicating a reference pattern with a conventional lathe. U.S. Pat. No. 3,434,384 to Cowles on Mar. 25, 1969, teaches a lathe attachment for facilitating milling and drilling of the workpiece while the workpiece is attached to the lathe. U.S. Pat. No. 3,626,456 to Freeborn on Dec. 7, 1971, teaches a radius turning attachment for lathes that may be operated manually or automatically. None of the prior art devices, however, provide for enabling a rose engine function on a conventional lathe.

Therefore, there is a need for a device that, when fixed to a conventional lathe, allows the is user to obtain desired "rose engine" or ornamental turning effects not otherwise possible with a conventional lathe. Such a needed device would allow normal use of the lathe without necessitating removal of the present invention therefrom. The present invention accomplishes these objectives.

SUMMARY OF THE INVENTION

The present device is a rose engine apparatus for attaching to a lathe having a lathe bed and a headstock with a rotatable spindle. The apparatus is added to the lathe so that the operator may easily accomplish rose-engine functions with a conventional lathe. Further, even with the apparatus fixed to the lathe, the lathe may be configured to be used in a normal manner if desired. The apparatus includes a pivotal attaching means for pivotally attaching the headstock with the lathe bed. The headstock may then rock back and forth, so as to move the workpiece fixed with the spindle back and forth.

A cam attachment means is fixed to the spindle of the headstock. At least one cam is selectively fixable to the cam attachment means, each having a continuous, variable radius along a peripheral edge thereof. Further, an indexing disk having a plurality of regularly-spaced apertures proximate a peripheral edge thereof may be included for is selectively locking the indexing disk and the spindle in a fixed rotational position with respect to the headstock. A cam roller is fixed with the lathe bed so as to make contact with the peripheral edge of a selected cam. A biasing spring urges the selected cam against the roller means, such that the headstock pivots with respect to the lathe bed as a function of the variable radius of the selected cam, as the spindle and workpiece rotates. As such, cutting operations can be performed on the workpiece that correspond to the variable radius of the selected cam.

An optional cutting frame may be mounted with the lathe bed through an adjustable radial mount that allows adjusting of the radial position of a distal cutting end of the cutting frame with respect to the spindle axis, and thereby also the workpiece (not shown). Such a cutting frame is further fixed with an adjustable axial mount for adjusting the axial position of the distal cutting end of the cutting frame with respect to the spindle axis.

The present apparatus allows rose engine effects to be easily accomplished utilizing a conventional lathe. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
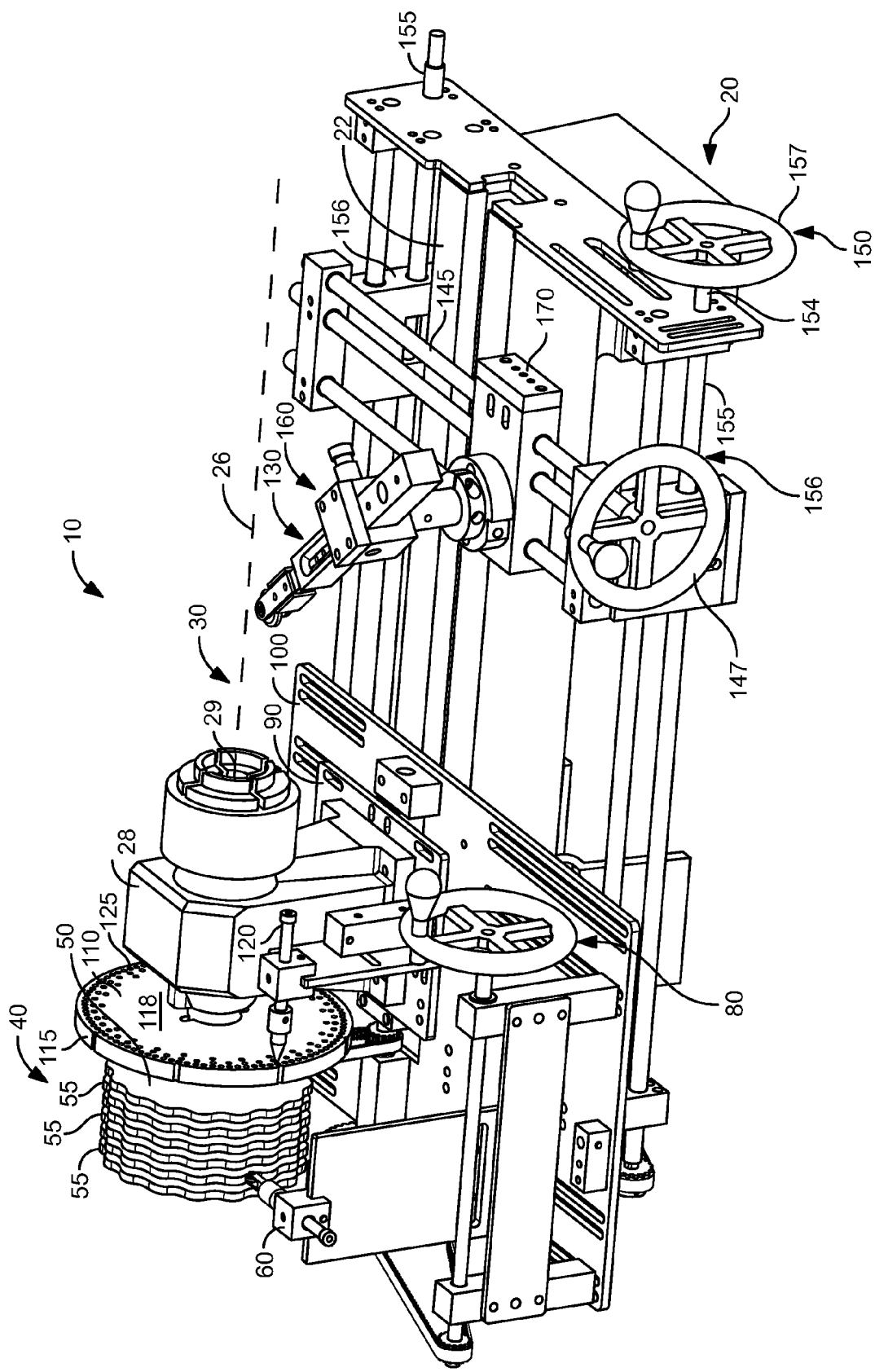
FIG. 1 is a perspective view of the invention, showing a front and right sides thereof.
Figure 2:
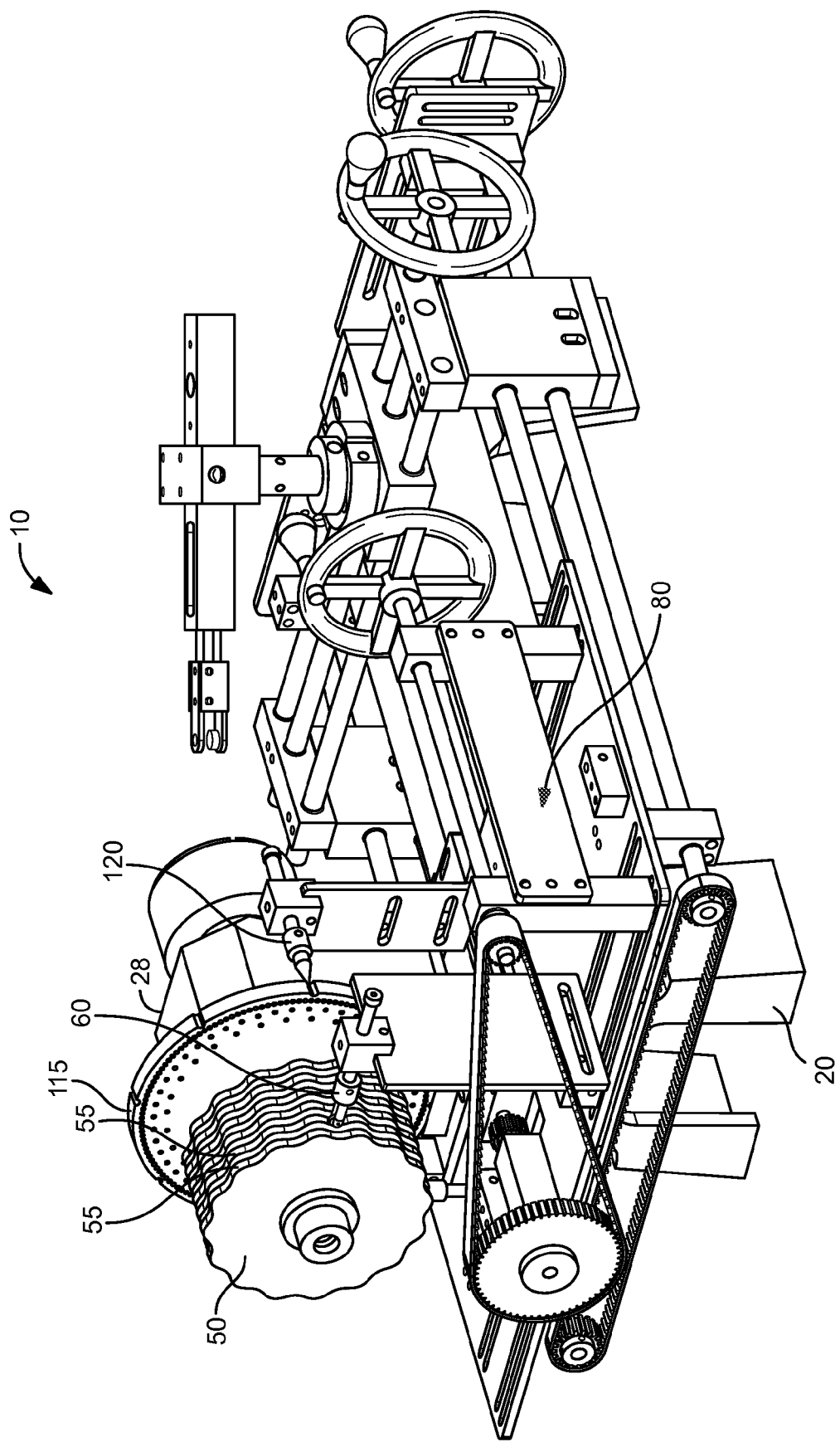
FIG. 2 is a perspective view of the invention, showing a front and left sides thereof, and illustrated with a cutting head removed for clarity.

FIGS. 1 and 2 illustrate a rose engine apparatus 10 for attaching to a lathe 20 having a lathe bed 22 and a headstock 28 with a rotatable spindle 29. Such a lathe 20 is commonly known in the marketplace and may further include a tailstock (not shown) for securing a workpiece (not shown) between the headstock 28 and the tailstock. Typically, such lathes 20 also include a motor (not shown) that drives the spindle 29 of the headstock 28, typically by a belt (not shown) fixed therebetween. The headstock 28 may be bolted to the lathe bed 22, and the tailstock may be slidably fixed to the lathe bed 22, as is typical in the art. As such, the headstock 28 and tailstock may be adjusted to accommodate the length of the workpiece.

The rose engine apparatus 10 is added to the lathe 20 so that the operator may easily accomplish rose-engine functions with a conventional lathe 20. Further, even with the apparatus 10 fixed to the lathe 20, the lathe 20 may be configured to be used in a normal manner if desired. The apparatus 10 includes a pivotal attaching means 30 for pivotally attaching the headstock 28 with the lathe bed 22. As such, the headstock 28 is removed from the lathe bed 22 and the attaching means 30 is fixed to both the headstock 28 and the lathe bed 22 in a non-sliding manner. As such, the headstock 28 is able to pivot with respect to the lathe bed 22 about an axis parallel to the rotational axis 26 of the spindle 29.

The pivotal attaching means 30 preferably includes a rigid pivot shaft 35 (FIGS. 3 and 4) generally parallel with the rotational axis 26 of the spindle 29, and pivotally fixed with both the headstock 28 and with the lathe bed 22. The pivotal attaching means 30 may include a rigid top plate 90 fixed to the headstock 28, such as with bolts and nuts (not shown), and a rigid bottom plate fixed to the lathe bed 22, such as with bolts and nuts (not shown). As such, the pivot shaft 35 may be fixed between the top plate 90 and the bottom plate 100 with a plurality of pivot blocks 38, each having apertures for receiving the pivot shaft 35, for example. At least one such pivot block 38 is fixed to the bottom plate 100, such as with bolts and nuts (not shown), and at least one pivot block 38 is fixed to the top plate 90, such as with bolts and nuts (not shown). As such, the plates 90,100 may pivot about the pivot shaft 35, at least until making mutual contact, for example. The headstock 28 may then rock back and forth on the top plate 90, so as to move the workpiece fixed with the spindle 29 back and forth.

In one embodiment of the invention, the pivotal attaching means 30 is included for the tailstock (not shown) of the lathe 20. As such, a workpiece fixed between the headstock 28 and the tailstock may be rocked back and forth on each pivotal attaching means 30 such that the workpiece rotational axis 26 remains parallel with each pivot shaft 35. Alternately, since the pivotal attaching means 30 raises the height of the headstock 28 with respect to the lathe bed 22, a spacing adapter (not shown) may be included to raise the tailstock by a substantially similar amount, keeping the spindle 29 of the headstock 28 axially aligned with that of the tailstock. As such, the lathe 20 may still be used conventionally without the need to remove the pivotal attaching means 30 from the lathe 20, provided the headstock 28 is pivotally fixed with respect to the lathe bed 22, such as by inserting a pair of spacer blocks or wedges (not shown) between the top plate 90 and the bottom plate 100 to prevent the pivotal attaching means 30 from pivoting.

Figure 3:
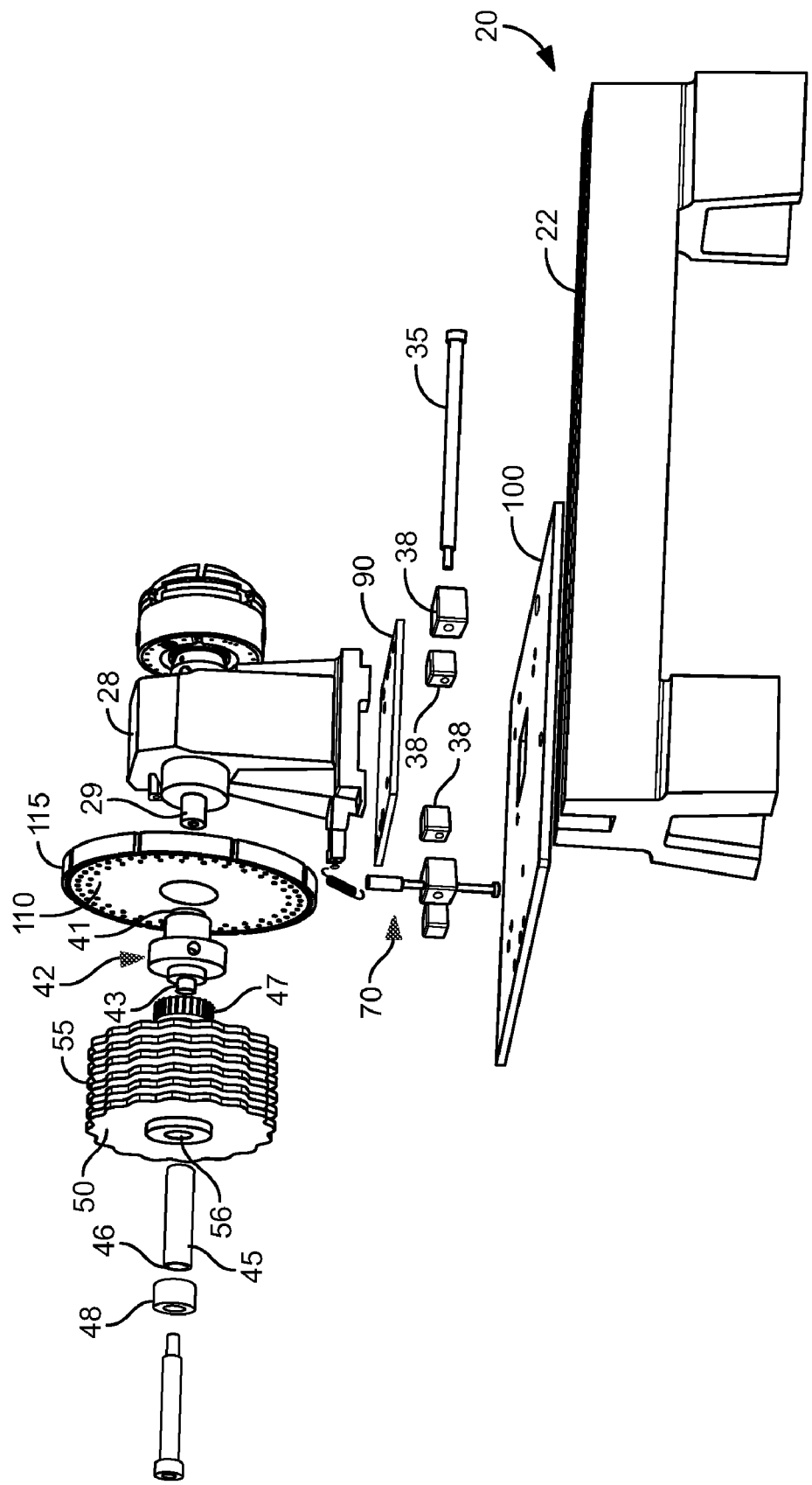
FIG. 3 is a partial exploded view of the invention, illustrating a cam attachment means and a pivotal attaching means thereof.

A cam attachment means 40 is fixed to the spindle 29 of the headstock 28. Such a cam attachment means 40 preferably comprises a spindle adapter 42 fixable to the spindle 29 on a proximal side 41 thereof. A cam shaft 45 may be attached to a distal side 43 of the spindle adapter 42. At least one cam 50 is selectively fixable to the cam attachment means 40 and has a continuous, variable radius r along a peripheral edge 55 thereof. The cam shaft 45 is adapted to receive at least one of the cams 50 through a central, preferably non-circular aperture 56 therein (FIG. 3). A distal end 46 of the cam shaft 45 may include a cam shaft compression cup 48 for selectively securing each cam 50 onto the cam shaft 45. Each cam 50 is preferably made from a rigid disk-like material, such as acrylic, brass, or the like.

Figure 7:
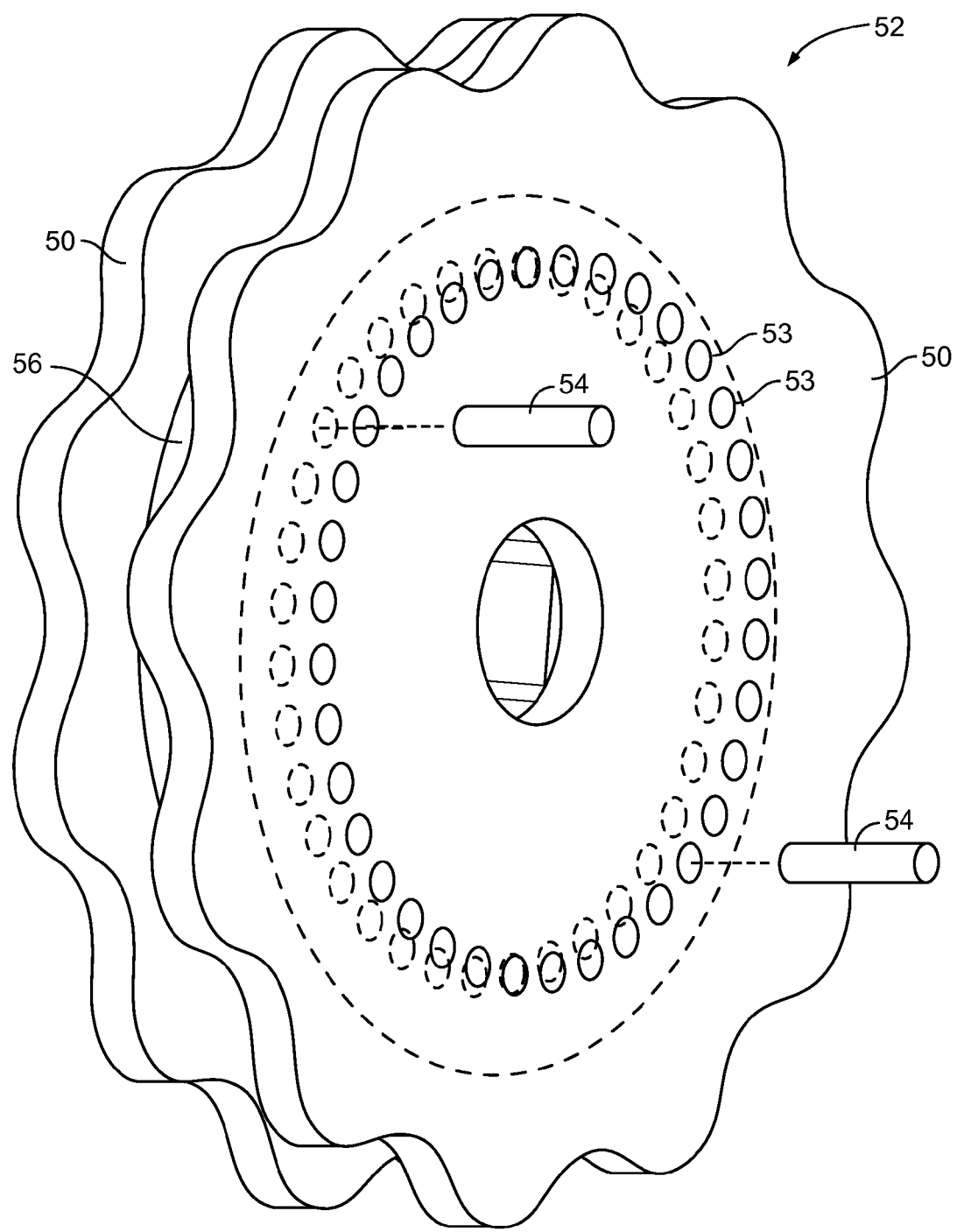
FIG. 7 is a perspective view of a phase indexing cam of the invention.

In one embodiment of the invention, the cam shaft 45 is a D-shape in cross section (not shown), and each cam 50 may be slid onto the cam shaft 45 in only one orientation with a D-shaped aperture therein (not shown). As such, free indexing of each cam 50 is prevented, allowing pre-phased cams 50 that are mutually keyed, for example, and for maintaining indexing of the cams 50 with the shaft 45 and thus the workpiece (not shown). To allow free indexing of a cam 50 with respect to the cam shaft 45, a phase indexing cam attachment 52 (FIG. 7) may be attached to the cam shaft 45, the phase indexing cam attachment 52 having two rotationally-coupled cams 50 that are longitudinally aligned on the cam shaft 45 but are free to rotate with respect to each other. A plurality of phase indexing apertures 53 are included in each such cam 50 of the phase indexing cam attachment 52, and the relative rotation thereof may be fixed by inserting at least one phase indexing pin 54 through aligned apertures 53 to lock the two cams 50 rotationally together. One of the cams 50 of the phase indexing cam attachment 52 may include a spacer 56 between the cams 50 that includes the apertures 53.

Figure 4:
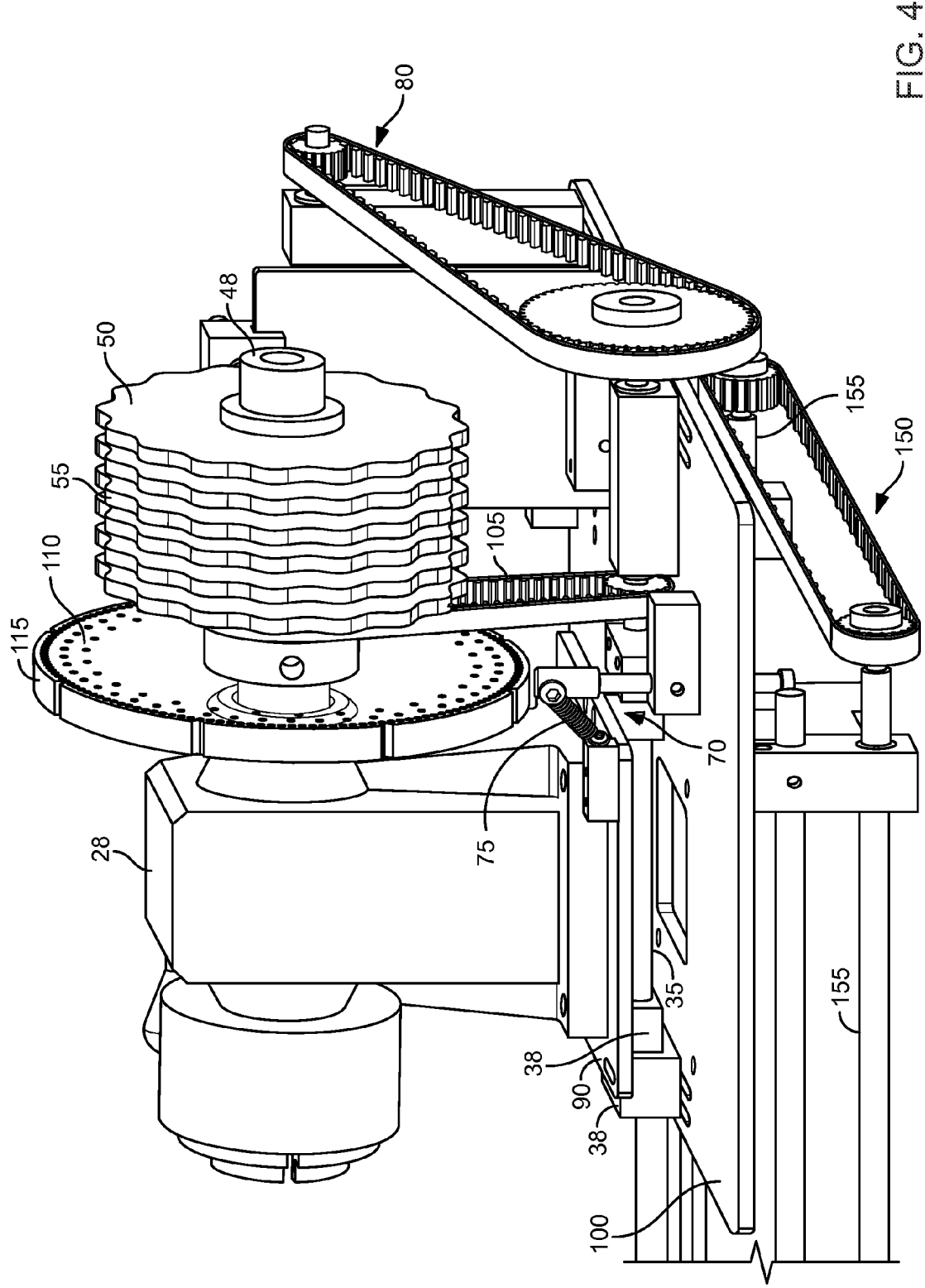
FIG. 4 is an enlarged perspective view of the invention, illustrating a means for biasing cams of the invention into a cam roller thereof.

A spindle pulley 47 may be fixed with the spindle 29, preferably between the spindle adapter 42 and the cam shaft 45. Such a spindle pulley 47 is adapted to rotate the spindle 29 by a drive belt 105 looped therearound (FIG. 4). When the lathe 20 is used conventionally, the drive belt 105 may be engaged to the lathe motor (not shown). Typically the drive belt 105 is necessarily longer than the original drive belt (not shown) supplied with the lathe 20 in order to accommodate the added height of the top and bottom plates 90,100 and the pivotal attachment means 30.

Further, an indexing disk 110 may be included, preferably fixed between the spindle adapter 42 and the spindle 29. Such an indexing disk 110 preferably has a plurality of regularly-spaced apertures 125 on a proximal side 118 thereof proximate a peripheral edge 115 thereof. In such an embodiment, an index locking means 120 is included, for example, to selectively lock the indexing disk 110 and the spindle 29 in a fixed rotational position with respect to the headstock 28, such as while using the lathe 20 in a conventional manner or when loading or unloading cams 50 on the cam shaft 45, or for certain types of rose engine work. Clearly the apertures 125 may alternately or also be included on the distal side (not shown) of the indexing disk 110.

A cam roller 60 is fixed with the lathe bed 22, such as by fixing the cam roller 60 to the lower plate 100, so as to make contact with the peripheral edge 55 of a selected cam 50. The cam roller 60 is rigid and preferably includes a wheel 65 at a distal end 68 thereof for making rolling contact with the peripheral edge 55 of each cam 50. Alternately, a low-friction pad (not shown) may be fixed to the distal end 68 of the cam roller 60 for low-friction slidable contact with the peripheral edge 55 of each cam 50. The cam roller 60 is preferably adjustable axially and laterally so as to allow the cam roller 60 to be positioned in a cam-engaged or a cam-disengaged position (not shown), and to allow the cam roller 60 to be positioned to contact any selected cam 50. As such, a plurality of different cams 50 may be engaged with the cam shaft 45, allowing a variety of rose engine effects to be quickly selectable by adjusting the cam roller 60 laterally.

A biasing means 70 for biasing one of the cams 50 against the roller means 60 is included, such that the headstock 28 pivots with respect to the lathe bed 22 in response to the variable radius r of the selected cam 50 as the spindle 29 is rotated. As such, cutting operations can be performed on the workpiece that correspond to the variable radius r of the selected cam 50. The biasing means 70 may be a spring 75 (FIG. 4), a piece of resilient material such as foam (not shown), or the like.

A manual crank arrangement 80 may be included for facilitating the rotation of the spindle 29 manually. Such a crank arrangement 80 may include a series of belts 105 and pulleys for driving the spindle pulley 47 manually. Alternately, the motor (not shown) of the lathe 20 may be utilized to rotate the spindle 29, albeit at a lower RPM than the typical such motor. Belts 105, pulleys 47, and gears (not shown) may be utilized as a step-down transmission in order to effect such a reduced RPM, as is known in the art. Alternately, a separate low RPM motor may be used (not shown).

Figure 5:
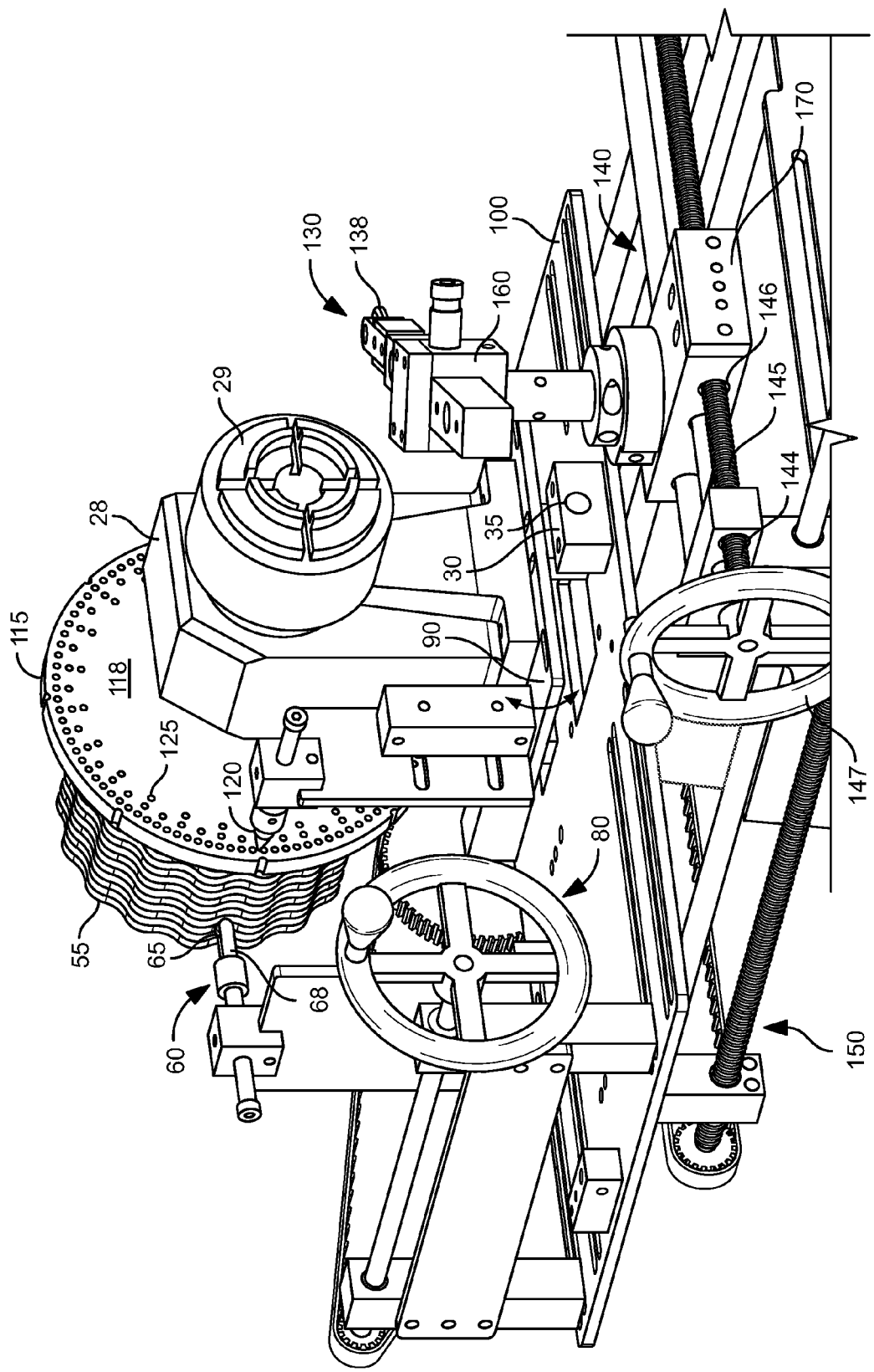
FIG. 5 is an enlarged perspective view of the invention, illustrating a cutting frame thereof.
Figure 6:
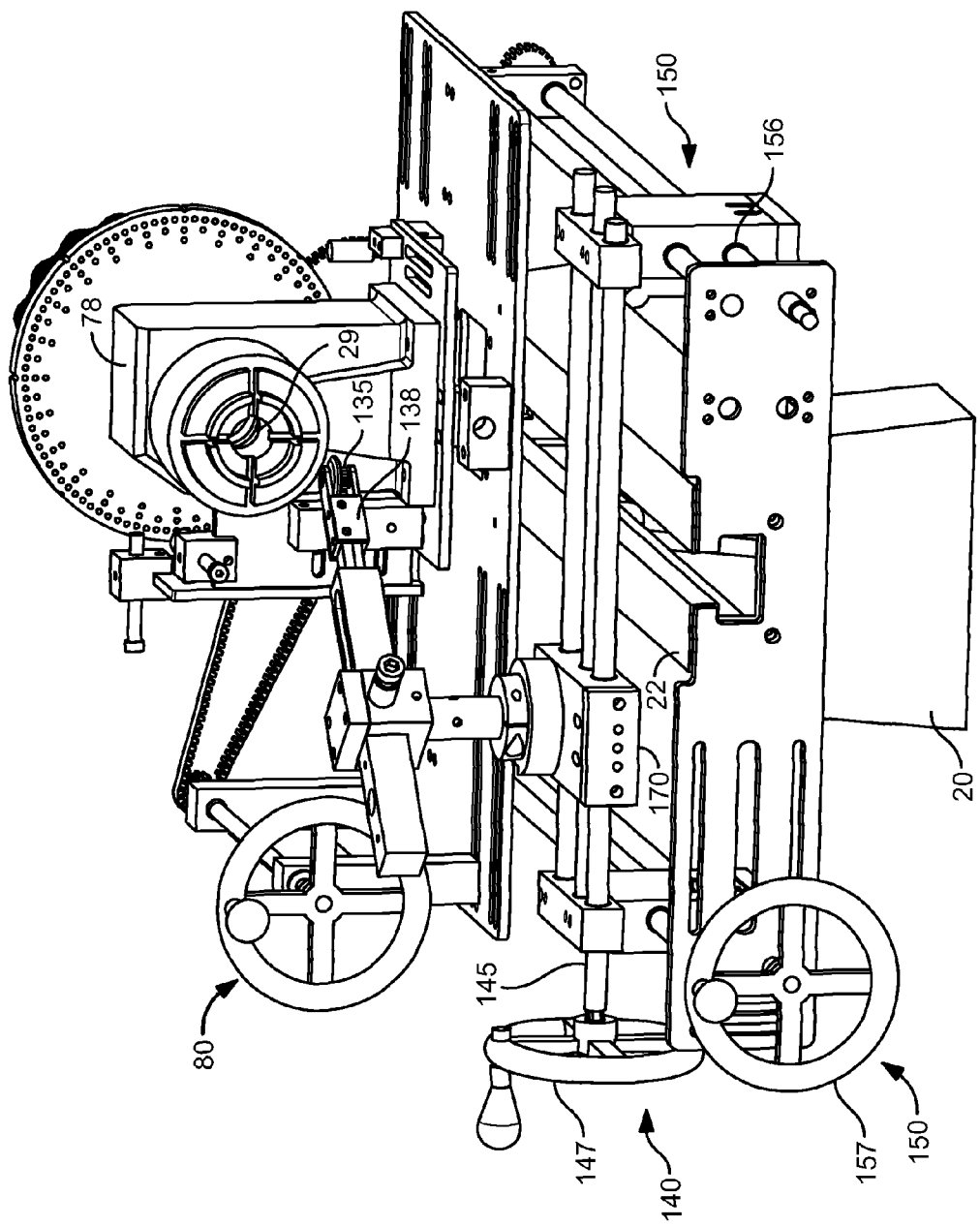
FIG. 6 is a perspective view of the invention, showing the right and back sides thereof.

FIGS. 5 and 6 illustrate an optional cutting frame 130 that may be included with the apparatus 10. The cutting frame 130 is mounted with the lathe bed 22 through an adjustable radial mount 140 that allows adjusting of the radial position of a distal cutting end 138 of the cutting frame 130 with respect to the spindle axis 26, and thereby also the workpiece (not shown). The distal cutting end 138 of the cutting frame 130 preferably includes a motor-driven cutting blade 135 rotatably fixed thereto. Such a motor (not is shown) may be mounted away from the cutting frame 130 or directly to the cutting frame 130 opposite the cutting head 138, for example.

The cutting frame 130 preferably further includes a cutting frame mount 160 fixed with a trolley 170 that is movable towards and away from the spindle axis 26 by the adjustable radial mount 140 (FIG. 5). Such an adjustable radial mount 140 preferably further includes at least one rigid threaded shaft 145 coupled with a threaded nut 146 fixed to the trolley 170. Each threaded shafts 145 includes a proximal end 144, at least one of the proximal ends 144 terminating at a manually rotatable actuator 147 (FIG. 1) or a secondary drive motor (not shown). Preferably the radial mount 140 further includes at least one non-threaded shaft and the trolley 170 includes at least one aperture such that as the rotatable actuator 147 is rotated, the threaded nut 146 moves the trolley 170 along the threaded shaft 145 while each non-threaded shaft maintains the rotational orientation of the trolley 170. Clearly the threaded nut 146 could be tapped in the trolley 170, as opposed to being a discrete nut 146 fixed to the trolley 170.

A pulley system (not shown) can be added to force a direct relationship between the rotation of the spindle 29 and the linear movement of the cutting frame 130 by the adjustable axial mount 150. As such, consistent patterns may be cut into the workpiece by the cutting blade 135.

Such a cutting frame 130 is further fixed with an adjustable axial mount 150 for adjusting the axial position of the distal cutting end 138 of the cutting frame 130 with respect to the spindle axis 26. Such an adjustable axial mount 150 preferably includes at least one second threaded shaft 155 coupled with a second threaded nut 156 fixed to the adjustable radial mount 140. Each second threaded shaft 155 terminates at a proximal end 154, at least one of which includes a second manually rotatable actuator 157 (FIG. 1) or a secondary drive motor (not shown). Preferably two such second threaded shafts 155 are included, each rotatably coupled by a belt 105 (FIG. 4), such that the adjustable radial mount 140 is axially adjustable at both ends thereof simultaneously, keeping each threaded shaft 145 substantially in its preferred orientation perpendicular to the spindle axis 26.

While a particular form of the invention has been illustrated and described, it will be apparent that various modifications can be made without departing from the spirit and scope of the invention. For example, various other adjustable radial mounts 140 and adjustable axial mounts 150 may be utilized. Likewise, other types of cutting implements, such as routers, or the like, may be included in place of the cutting frame 130. Accordingly, it is not intended that the invention be limited, except as by the appended claims.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in its implementation details, while still being encompassed by the invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways.

Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A rose engine apparatus for attaching to a lathe having a lathe bed and a headstock with a rotatable spindle, the rose engine apparatus comprising:
   a pivotal attaching means for pivotally attaching the headstock to the lathe bed,
   a cam attachment means fixed to the spindle of the headstock,
   at least one cam selectively fixable to the cam attachment means and having a variable radius along a peripheral edge thereof;
   a cam roller fixed with the lathe bed and adapted to contact the peripheral edge of each cam; and
   a means for biasing the cam against the cam roller, such that the headstock pivots is with respect to the lathe bed in response to the variable radius of the cam as the spindle is rotated.

2. The apparatus of claim 1 further including a manual crank arrangement for manually rotating the spindle.

3. The apparatus of claim 1 wherein the pivotal attaching means includes a pivot shaft pivotally fixed with both the headstock and with the lathe bed, the pivot shaft generally parallel with the axis of rotation of the spindle.

4. The apparatus of claim 3 wherein the headstock is fixed to a top plate and the lathe bed is fixed to a bottom plate, the pivot shaft being pivotally fixed therebetween at a plurality of pivot blocks thereof, at least one pivot block fixed to the bottom plate and at least one other pivot block fixed to the top plate.

5. The apparatus of claim 1 wherein the cam attachment means comprises a spindle adapter fixable to the spindle on a proximal side thereof and with a cam shaft on a distal side thereof, the cam shaft adapted to receive each cam through a central non-circular aperture therein.

6. The apparatus of claim 5 wherein the cam attachment means further includes a spindle pulley fixed between the spindle adapter and the cam shaft, the spindle pulley adapted to rotate the spindle by a drive belt looped therearound.

7. The apparatus of claim 5 wherein a distal end of the cam shaft includes a removable cam shaft compression cup for selectively securing each cam onto the cam shaft.

8. The apparatus of claim 5 wherein the cam attachment means further includes an indexing disk fixed between the spindle adapter and the spindle, the indexing disk having a plurality of regularly-spaced transverse apertures therethrough proximate a peripheral edge thereof, and further including an index locking means for selectively locking the indexing disk and the spindle in a fixed rotational position with respect to the headstock.

9. The apparatus of claim 1 wherein the cam roller includes a wheel at a distal end thereof for making rolling contact with the peripheral edge of each cam.

10. The apparatus of claim 1 wherein the means for biasing the cam against the cam roller includes a spring fixed between the bottom plate and the top plate and positioned to urge each cam into the cam roller.

11. The apparatus of claim 1 further including a cutting frame mounted with the lathe bed through an adjustable radial mount for adjusting the radial position of a distal cutting end of the cutting frame with respect to the spindle axis, the adjustable radial mount fixed with an adjustable axial mount for adjusting the axial position of the distal cutting end of the cutting frame with respect to the spindle axis.

12. The apparatus of claim 11 wherein the cutting frame includes a motor-driven cutting blade rotatably fixed at the distal cutting end, the cutting frame including a cutting frame mount fixed with a trolley, the trolley movable towards and away from the spindle axis by the adjustable radial mount.

13. The apparatus of claim 12 wherein the adjustable radial mount includes a threaded shaft coupled with a threaded nut fixed to the trolley, the threaded shaft terminating at a proximal end at a manually rotatable actuator.

14. The apparatus of claim 12 wherein the adjustable axial mount includes a second threaded shaft coupled with a threaded nut fixed to the adjustable radial mount, the second threaded shaft terminating at a proximal end at a second manually rotatable actuator.

15. The apparatus of claim 6 wherein the drive belt is further fixed to a manual crank arrangement for manually rotating the spindle.

16. The apparatus of claim 1 wherein a phase indexing cam attachment may be fixed to the cam shaft, the cam attachment including two cams longitudinally aligned and rotationally coupled to each other, one of the cams for fixing to the cam shaft, each cam having a plurality of cooperative phase indexing apertures through which at least one phase indexing pin may be introduced to rotationally and selectively lock each of the cams rotationally together.

\* \* \* \* \*